United States Patent
Ngo et al.

(10) Patent No.: US 8,411,579 B2
(45) Date of Patent: Apr. 2, 2013

(54) COMMUNICATION SYSTEM HIERARCHICAL TESTING SYSTEMS AND METHODS—ENTITY DEPENDENT AUTOMATIC SELECTION OF TESTS

(75) Inventors: Chuong Ngoc Ngo, Ottawa (CA); Christopher Warren Murray, Ottawa (CA); Greg Soprovich, Ottawa (CA)

(73) Assignee: Alcatel Lucent, Paris (FR)

( * ) Notice: Subject to any disclaimer, the term of this patent is extended or adjusted under 35 U.S.C. 154(b) by 1469 days.

(21) Appl. No.: 11/243,196

(22) Filed: Oct. 4, 2005

(65) Prior Publication Data

US 2007/0076616 A1 Apr. 5, 2007

(51) Int. Cl.
*H04L 12/26* (2006.01)
(52) U.S. Cl. .............. 370/248; 370/400; 714/25
(58) Field of Classification Search .......... 370/240, 370/241, 400
See application file for complete search history.

(56) References Cited

U.S. PATENT DOCUMENTS 6,282,678 B1  8/2001 Snay et al.
6,745,145 B2 * 6/2004 Lara et al. ............. 702/121
2004/0066747 A1 * 4/2004 Jorgensen et al. ......... 370/241
2006/0101404 A1 * 5/2006 Popp et al. ............... 717/124
2006/0174162 A1 * 8/2006 Varadarajan et al. ........ 714/38
2007/0058567 A1 * 3/2007 Harrington et al. ......... 370/254

OTHER PUBLICATIONS

Stokes, et al 'Testing Hierarchical Virtual Private LAN Services 'Internet Draft Document Provider Provisioned VPN WG, Jun. 2003.*
European Patent Office, "extended European search report", Dec. 6, 2012, 7 pp.

* cited by examiner

*Primary Examiner* — Kevin C Harper
*Assistant Examiner* — Henry Baron
(74) *Attorney, Agent, or Firm* — Eckert Seamans Cherin & Mellott, LLC

(57) ABSTRACT

Hierarchical testing systems and methods for testing communication systems are disclosed. Testing functions which test entities such as equipment or services of a communication system are classified into testing function groups. The testing function groups have an order which is based on an order of operational dependencies in the communication system. Testing functions to be performed for a particular entity to be tested are selected from testing functions for testing the entity itself and testing functions for testing other entities that have an operational dependency with the entity to be tested. Related data structures and user interfaces are also disclosed.

10 Claims, 10 Drawing Sheets

| Application (Level 7) | DHCP 52 | UDP/TCP 54 | DNS 56 | MPLS/BGP VPN |
|---|---|---|---|---|
| | DHCP Lookup | UDP/TCP Probe | DNS Lookup | |

| | | VLL 62 | VPLS 64 | IES 66 | 68 | VLAN 69 |
|---|---|---|---|---|---|---|
| | | mac-populate | mac-ping | | ping | mac-ping |
| | 61 | mac-purge | mac-trace | 65 | trace | mac-trace |
| | | mac-ping | mac-populate | 63 | | |
| Application (Level 6) | | mac-trace | mac-purge | | | |
| | | | cpe-ping | | | |
| | | | mfib-ping | | | |

67 (brace for VLAN row)

| Service Transport Binding (Level 5) | Circuit 72 |
|---|---|
| | svc-ping 74 |

| Service Transport (Level 4) | Tunnel 82 |
|---|---|
| | pipe-type1-ping } 84 |
| | pipe-type2-ping |

| | | LSP 92 | | GRE 98 |
|---|---|---|---|---|
| | 91 | lsp-ping | | |
| | | lsp-trace | | |
| Transport (Level 3) | | LDP 94 | RSVP 96 | |
| | 93 | ldp-trace | | |
| | | ldp-ping | | |

| Routed Network (Level 2) | IP Unicast 102 | IP Multicast 104 | |
|---|---|---|---|
| | icmp-ping | state | trace |
| | 101 icmp-trace 103 | info | mgmt |

105

| L1/L2 (Level 1) | ATM 112 | Frame Relay 114 | POS 116 | Ethernet 118 |
|---|---|---|---|---|
| | atm-ping 111 | | | mac-ping |
| | | | | mac-trace |

| # | Test Type | Test Name | Message Size | Forwarding CLass | Generated Trap |
|---|-----------|-----------|--------------|------------------|----------------|
| 1 | mac-ping | Test 1 | 300 | BE | Yes |
| 2 | mac-ping | Test 2 | 300 | L1 | Yes |
| 3 | mac-ping | Test 3 | 300 | H1 | No |
| 4 | lsp-ping | Test 4 | 300 | H1 | Yes |
| 5 | lsp-ping | Test 5 | 300 | H1 | Yes |

General | Processing Rules | Bound Entities

Name: VPLS Policy #3
ID: 50
Description:
Entity Type: VPLS Service

Add Test
Edit
Remove
Move Up
Move Down

Update Test Suites

Reset | OK | Cancel | Apply

COMMUNICATION SYSTEM HIERARCHICAL TESTING SYSTEMS AND METHODS—ENTITY DEPENDENT AUTOMATIC SELECTION OF TESTS

CROSS-REFERENCE TO RELATED APPLICATIONS

This application is related to U.S. patent application Ser. No. 11/243,388, entitled "MANAGEMENT OF TIERED COMMUNICATION SERVICES IN A COMPOSITE COMMUNICATION SERVICE", and Ser. No. 11/243,005, entitled "COMPOSITE COMMUNICATION SERVICE MANAGEMENT", both filed of even date herewith and assigned to the Assignee of the present application. The entire contents of each of these related applications are incorporated herein by reference.

FIELD OF THE INVENTION

This invention relates generally to communications and, in particular, to testing of a communication system for diagnostic and/or monitoring purposes.

BACKGROUND

According to current communication system management systems and techniques, a network operator or other personnel manually selects and executes communication system tests to determine the root cause of service performance degradations or other observed conditions affecting a service which is running in the communication system.

This process tends to be time consuming and also requires a high level of skill, particular in larger scale or complex communication systems. For example, a communication service may rely on many underlying technologies, any of which might be responsible for an observed problem. In order to properly test such a service, an operator would be required to first investigate exactly how the service is configured, the technologies on which the service relies, and the appropriate tests for those technologies. Any tests would then have to be executed in the correct order. All of these operations are performed manually in conventional systems.

Thus, there remains a need for improved techniques for testing communication systems, for troubleshooting service level problems or monitoring services, for example.

SUMMARY OF THE INVENTION

Some embodiments of the invention are directed to organizing and managing testing functions for a communication system. A hierarchical communication service assurance system may be provided, for instance, in which testing functions are arranged into groups and specific testing functions for a communication service to be tested are automatically selected based on a topology of the service. Test selection may also take into account the capabilities of communication equipment which supports a communication service. It possible, for example, that some communication network elements are not capable of performing certain tests. These capabilities can also be used to control the selection of tests.

Testing functions, such as OAM (Operations Administration and Maintenance) tests, may be divided into different "test levels" which are based on the structure of communication services in a communication system. If there are performance issues with a higher level, such as a communication service level, then lower level tests may be invoked to find the root cause of the higher level issues. Within a level, there may be several related testing functions, possibly of different types.

In some embodiments, a set of tests for components of an entity of a communication system, illustratively a communication service, protocol layer, or communication equipment can be automatically generated. All of the generated tests, or only selected ones of the generated tests, may be executed in the communication system.

According to an aspect of the invention, there is provided a system which includes a testing function classifier and a testing function manager. The testing function classifier is configured to assign testing functions for testing entities of a communication system to a testing function group of a plurality of testing function groups. The testing function manager is operatively coupled to the testing function classifier and configured to associate an entity of a communication system with a group of testing functions for testing another entity of the communication system based on an operational dependency, if any, between the entity and the other entity.

The entities may include one or more of: communication services supported in the communication system, layers of a communication protocol stack used in the communication system, and equipment comprising the communication system.

The testing function manager may be further configured to select, from each testing function group associated with an entity to be tested, a testing function to be performed in the communication system.

In some embodiments, the system also includes a communication system interface, operatively coupled to the testing function manager, for transmitting information to the communication system. The testing function manager may cause one or more testing functions to be performed in the communication system by transmitting information to the communication system.

In some embodiments, the testing function manager is further configured to determine a sequence in which each selected testing function is to be performed in the communication system.

The system may also include an interface for receiving one or more of: inputs to define one or more testing function groups of the plurality of testing function groups, inputs to control which testing functions are to be performed in the communication system, inputs to control a sequence in which testing functions are to be performed in the communication system, inputs to specify an entity to be tested, and inputs to specify other entities having an operational dependency with an entity to be tested, for which testing functions are to be selected.

The testing function groups may include a testing function group having a plurality of testing function sub-groups for including testing functions that test entities of respective different types.

The entities tested by testing functions in one or more sub-groups of a testing function group may have the same or different operational dependencies than entities tested by testing functions in other sub-groups of the testing function group.

The testing function manager may be further configured to select a testing function from each of one or more testing function groups respectively associated with the entity and each other entity having an operational dependency with the entity based on testing capabilities of one or more of the entity and each other entity.

A method is also provided, and includes defining a plurality of testing function groups for arranging testing functions, the testing functions being for testing entities of a communication system, and defining a relative order of the plurality of testing function groups based on an order of operational dependency between the entities.

The method may include operations of assigning testing functions to a testing group of the plurality of testing groups, and associating an entity of a communication system with a group of testing functions for testing another entity of the communication system based on an operational dependency, if any, between the entity and the other entity.

In some embodiments, the method further includes selecting, from each testing function group associated with an entity to be tested, a testing function to be performed in the communication system. A sequence in which each selected testing function is to be performed in the communication system may also be determined.

The sequence may include a sequence condition which causes one or more of: halting of the sequence of testing functions where a testing function confirms normal operation of an entity, execution of a next testing function in the sequence where a current testing function indicates an error in operation of an entity, and selection of a next testing function from a plurality of testing functions based on a result of a current testing function.

In some embodiments, the method includes selecting a testing function from each of one or more testing function groups respectively associated with the entity and each other entity having an operational dependency with the entity based on testing capabilities of one or more of the entity and each other entity. A sequence in which each selected testing function is to be performed may be determined based on one or more of: operational dependencies between the entity and each other entity, and inputs specifying a testing function sequence.

The method may also include one or more of: analyzing results of one or more selected testing function, and providing a representation of results of one or more selected testing function.

A data structure according to another aspect of the invention includes information identifying a testing function for testing an entity of a communication system, and information indicating a testing function group, of a plurality of testing function groups, to which the testing function has been assigned, the plurality of testing function groups having a relative order based on an order of operational dependency between the entity and other entities of the communication system.

Yet another aspect of the invention provides a user interface which includes respective visual elements representing testing functions for testing entities of a communication system, the testing functions comprising testing functions assigned to a plurality of testing function groups, each testing function group including a respective set of one or more testing functions for testing an entity of the communication system. The testing functions represented by the visual elements include testing functions for testing entities related by an operational dependency in the communication system.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings, in which:

FIG. 2 is a block diagram of an example testing function group structure;

FIG. 6 is a block diagram of an example UI (User Interface) for defining and managing a testing policy;

DETAILED DESCRIPTION OF PREFERRED EMBODIMENTS

Figure 1:
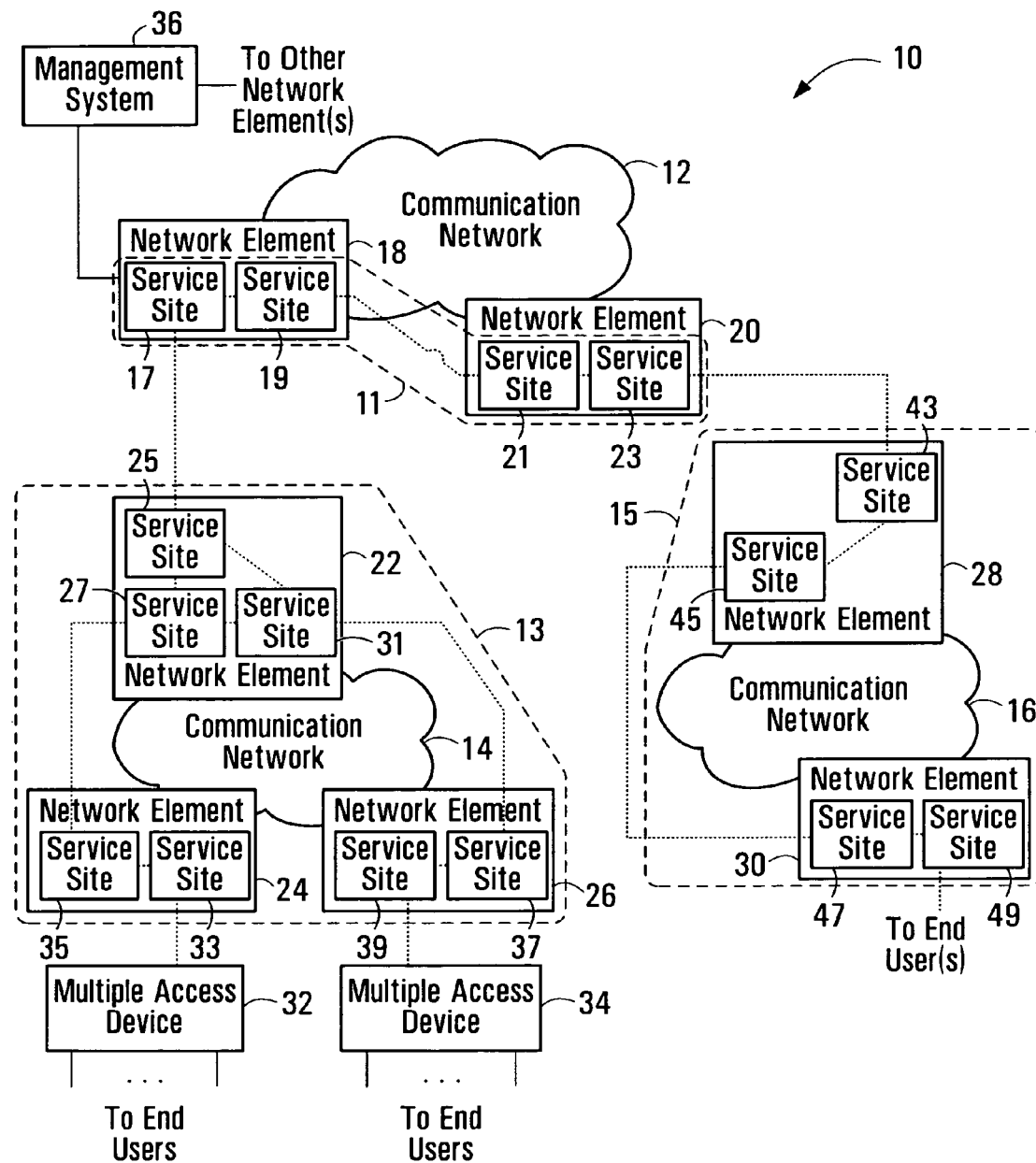
FIG. 1 is a block diagram of a communication system.

FIG. 1 is a block diagram of a communication system. The communication system 10 includes multiple communication networks 12, 14, 16 having network elements 18, 20, 22, 24, 26, 28, 30. The network elements 24, 26 of the communication network 14 are operatively coupled to multiple access devices 32, 34 which provide access to the communication network 14 for end users. Any or all of the network elements 18, 20, 22, 24, 26, 28, 30 may be managed by a management system 36.

Communication systems may have many different topologies, including more or fewer communication networks having similar or different equipment than shown in FIG. 1. For example, different communication networks may use different access schemes. As shown, end users access the communication network 14 through multiple access devices 32, 34, whereas more direct end user access is provided to the communication network 16 through the network element 30. It should therefore be appreciated that the system of FIG. 1, as well as the contents of the other drawings, are intended solely for illustrative purposes, and that the present invention is in no way limited to the particular example embodiments explicitly shown in the drawings and described herein.

Switches and routers are illustrative of the types of communication equipment represented by the network elements 18, 20, 22, 24, 26, 28, 30. The communication networks 12, 14, 16, in addition to the border or edge network elements explicitly shown in FIG. 1, may also include intermediate network elements which route communication traffic through the communication networks 12, 14, 16. Any or all of the communication networks 12, 14, 16 may thus include edge, core, and/or other types of communication equipment. In other embodiments, the techniques disclosed herein are used in conjunction with communication equipment which might not necessarily be connected in a network. References to communication equipment and connections should thus be interpreted accordingly.

Functions for managing the communication networks 12, 14, 16, to configure connections and services, control communication equipment, and/or monitor network operations for instance, may be provided by the management system 36. Although shown as a single component in FIG. 1, multiple management systems may be implemented where communication equipment is operated by different entities. An example of a management system is described in detail below with reference to FIG. 4. Other management or control equipment, such as local operator terminals, may also be provided in any or all of the communication networks 12, 14, 16.

The multiple access devices 32, 34 distribute communication traffic to and/or receive communication traffic from end user equipment, such as computer systems, by which communication traffic is generated and transmitted and/or received and terminated. Where connections to end users are DSL (Digital Subscriber Line) connections, for example, the multiple access devices 32, 34 may be DSLAMs (DSL Access Multiplexers). Customer edge routers and other customer premises equipment are further examples of the multiple access devices 32, 34.

Many different types of network, access, and end user communication equipment, as well as the operation thereof, will be apparent to those skilled in the art. In general, communication traffic is transferred between sources and destinations, possibly through one or more of the communication networks 12, 14, 16. Traffic may be translated between different protocols or formats during its transfer. As discussed in further detail herein, the transfer of communication traffic may involve multiple communication services supported in the communication system 10, and illustratively communication services supported in the different communication networks 12, 14, 16, which have been configured to cooperate to provide a composite communication service.

In one particular example embodiment, traffic is routed in the communication network 12 using IP (Internet Protocol) or MPLS (Multi-Protocol Label Switching), the communication networks 14, 16 are Ethernet networks, and the multiple access devices 32, 34 are DSLAMS.

However, it should be appreciated that embodiments of the invention are not limited to any particular types of communication equipment, transfer mechanisms, or protocols. Those skilled in the art will be familiar with various communication system implementations and services in conjunction with which embodiments of the invention may be used. It is also contemplated that embodiments of the invention may be applicable to communication systems and services which are subsequently developed.

Communication services 11, 13, 15 are also shown in FIG. 1, in the form of service sites and interconnections therebetween. The communication services 11, 13, 15 are supported by communication equipment in the communication networks 12, 14, 16, in that these services transfer data through the communication equipment and physical connections between that equipment. However, the communication networks and their elements might not have any type of service "awareness". For example, a network element would not normally know the complete topology of a communication service which has been set up by provisioning service sites at that network element. Moreover, communication equipment generally cannot distinguish a connection between service sites of the same communication service from a connection between service sites of different communication services. Clearly, communication equipment would normally be completely unaware when an SAP (Service Access Point) of one of its service sites, through which a communication service is accessible, is actually hooked up to an SAP of another service site for a different communication service via a cable, for example.

Consider an example scenario in which the whole system 10 under the management of the management system 36, illustratively an NSM (Network and Service Management system) through which both communication equipment and services can be configured and managed. The management system 36 can be used to provision service sites in any of its managed network elements, which includes all of the network elements 18, 20, 22, 24, 26, 28 in this example.

As shown in FIG. 1, the service sites 17, 19, 21, 23 are provisioned in the network elements 18, 20 and interconnected to set up a communication service 11 in the communication network 12, the service sites 25, 27, 31, 33, 35, 37, 39 are provisioned in the network elements 22, 24, 26 and interconnected to provide a communication service 13 in the communication network 14, and the service sites 43, 45, 47, 49 are provisioned in the network elements 28, 30 and interconnected to provide another communication service 15 in the communication network 16. Some of these service sites, specifically the service sites 17/25, 23/43, are connected between different services to establish a composite communication service which uses all of the individual communication services 11, 13, 15. Of course, other types of service site and communication service arrangements are also possible.

In the context of a composite communication service which encompasses all of the communication services 11, 13, 15, the network elements 18, 20, 22, 24, 26, 28 in the communication networks 12, 14, 16 may be considered a portion of an overall service provider network.

The relationship between actual equipment and communication services will be apparent to those skilled in the art from FIG. 1. Communication services effectively overlay the communication equipment. For example, connections between the network elements 18/22, 20/28 may be physical links, whereas logical connections between the service sites 17/25, 23/43, shown in dashed lines in FIG. 1, allow data transfer between service sites over the physical links.

A composite communication service is one example of an entity to which the techniques disclosed herein may be applied. The specific example of composite communication services is considered in further detail below. However, it should be appreciated that embodiments of the present invention may also or instead be used in conjunction with other types of entity.

The transfer of communication traffic by a communication service, or more generally any entity of a communication system, may involve multiple underlying entities. For example, a communication service 11 provided in the communication network 12 may involve transfer of communication traffic through a logical connection established over a transport protocol, all of which runs over physical communication equipment. The communication service 11 may be considered one entity of the communication system 10 which is operationally dependent upon other entities of the system. The communication service 11 cannot operate properly unless its logical connection is operating properly, which in turn is affected by operation of the transport protocol and the physical equipment.

It will thus be appreciated that there is an order of operational dependency of all of these entities, namely the communication service, the connection, the transport, and the physical equipment.

This type of layering technique is used in data networks to implement such features as efficient diagnostics and bandwidth management. A typical service provider data network might start with a physical layer using a combination of Ethernet and SONET/SDH (Synchronous Optical Network/Synchronous Digital Hierarchy) technologies. There are multiple layering methods to carry data over service provider networks, including, among others, TCP (Transmission Control Protocol)/IP/Ethernet/MPLS/IP/PPP (Point to Point Protocol)/SONET and UDP (User Datagram Protocol)/IP/Ethernet/ATM (Asynchronous Transfer Mode)/MPLS/IP/Ethernet. As noted above, the root cause of problems observed at higher layers might very well come from a lower layer. Thus, a good diagnostic mechanism should have built-in hierarchical layer awareness.

FIG. 2 is a block diagram of an example testing function group structure. As shown, testing functions for testing various entities of a communication system may be arranged or classified according to a hierarchical structure 40. The structure 40 includes groups 50, 60, 70, 80, 90, 100, 110, which have an order based on operational dependencies of the testable entities.

The groups, testing functions, testable entities, and order shown in FIG. 2 represent examples only, and do not limit the scope of the invention. Specific operational dependencies may vary, for example, for different communication network and/or protocol stack implementations. Those skilled in the art will be familiar with various types of communication system in conjunction with which embodiments of the invention may be used. It is also contemplated that embodiments of the invention may be applicable to communication systems and services which are subsequently developed. The table shown in FIG. 2 also does not always imply a top-down relationship between testing levels. For example, an entity tested by testing functions in the group 90 may be operationally dependent on another technology in the same group or at a higher group. LDP (Label Distribution Protocol) over RSVP (Resource reSerVation Protocol), for instance, could have an item in group 90 dependent on another item in group 90.

The highest group 50 in the structure 40 includes testing functions for testing application entities of a communication system. The testing functions in the group 50 are further arranged into sub-groups 52, 54, 56 for testing different types of application entity, including a DHCP (Dynamic Host Configuration Protocol) application entity, a UDP/TCP application entity, and a DNS (Domain Name System) application entity, respectively. The testing functions in the group 50 include a DHCP lookup function in the DHCP sub-group 52, a UDP/TCP probe function in the UDP/TCP sub-group 54, and a DNS lookup function in the DNS sub-group 56.

The next testing function group 60 in the example structure 40 includes testing functions for testing service entities upon which the application entities at the next higher level are dependent. This concept is referred to herein as operational dependency. A service entity may be considered as providing a transport for an application entity, for example. More generally, operational dependencies may exist between entities associated with testing functions and testing function groups at the same or different levels.

Like the testing functions in the testing function group 50, the testing functions in the group 60 are arranged into sub-groups 62, 64, 66, 68, 69 which correspond to different types of services, namely VLL (Virtual Leased Line) services, VPLSs (Virtual Private Local area network Services), IESs (Internet Enhanced Services), MPLS/BGP VPN (Multi-Protocol Label Switching/Border Gateway Protocol Virtual Private Network), also sometimes referred to Layer 3 VPN or VPRN (Virtual Private Routed Network), and VLAN (Virtual Local Area Network) services, all of which will be familiar to those skilled in the art. Each sub-group includes testing functions for testing the respective types of service entities.

The VLL sub-group 62 includes MAC (Media Access Control)-populate, MAC-purge, MAC-ping, and MAC-trace testing functions, as shown at 61. The VPLS sub-group 64 also includes MAC-ping, MAC-trace, MAC-populate, and MAC-purge testing functions, as well as CPE (Customer Premises Equipment)-ping and MFIB (Multicast Forwarding Information Base)-ping testing functions, as shown at 63. IES testing functions, if any, would be included in the sub-group 66. The testing functions 65 in the MPLS/BGP VPN sub-group 68 include ping and trace functions. The VLAN sub-group 69 includes MAC-ping and MAC-trace testing functions 67.

Any or all of the testing functions in a sub-group may be performed in a communication system when the corresponding entity is to be tested. The testing functions to be performed may be selected automatically or manually by a user. In some embodiments, all testing functions in a testing function group or sub-group are automatically selected, and a user then selects which of those testing functions will actually be performed. Also, in some embodiments, a sub-set of the testing function group or sub-group is automatically selected based on information associated with the entity to be tested.

It should also be noted from the group 60 that group and/or sub-group assignments are not exclusive. Although each testing function group includes testing functions for testing entities at a particular protocol or architectural level in a communication system, the same testing function may be used to test more than one type of entity at that level. For example, the testing function sub-groups 62, 64, 69 all include MAC-ping and MAC-trace testing functions.

Entities tested by testing functions of different sub-groups of the same testing function groups might not have the same operational dependencies. This will be evident from a comparison of the VLAN sub-group 69 and the MPLS/BGP VPN sub-group 68, for example. Whereas the MPLS/BGP VPN sub-group 68 is ordered in the structure 40 above the groups 70, 80, 90, 100, and 110, the sub-group 69 is ordered above only the group 110.

In one implementation, communication traffic for a communication service is carried over a communication path which is logically associated with the communication service by a unidirectional binding. The testing function groups 70 and 80 include respective testing functions for testing the binding and the communication path. A binding entity, also referred to herein as a circuit, is testable using an svc (service)-ping testing function 74. A communication path, which might also be referred to as pipe or tunnel, is testable using ping functions 84. The specific nature of a path entity testing function will be dependent upon the type of path being tested.

In FIG. 2, the sub-groups 72, 82 of the groups 70, 80 have been shown separately for illustrative purposes. A testing function group such as 70, which includes tests for only one type of entity, need not necessarily include sub-groups. However, arrangement of testing functions into sub-groups may facilitate future expansion of the testing group to include testing functions for other types of entity at the same level. For example, the single sub-group 72 could be defined in the structure 40 so that the testing function 74 has already been assigned to a sub-group in the event that another sub-group is subsequently defined.

As will be evident from the sub-group 82, testing functions for different types of an entity may be included in the same group/sub-group. Thus, sub-group sorting is optional, and might not be implemented in all embodiments.

The testing function group 90, for entities of a transport level in the example structure in FIG. 2, include sub-groups 92, 94, 96, 98 for including testing functions which test LSP (Label Switched Path) entities, LDP entities, RSVP entities, and GRE (Generic Routing Encapsulation) entities. The LSP sub-group 92 includes LSP-ping and LSP-trace functions 91, and the LDP sub-group 94 includes LDP-trace and LDP-ping functions 93. Testing functions for testing RSVP entities and GRE entities would be included the sub-groups 96, 98, respectively.

The testing function group 90 also illustrates that a testing function group may include sub-groups 92, 94/96 at different sub-levels in the structure 40. For example, LSPs are set up using an LDP or RSVP session. If an LDP/RSVP session fails, then the LSP could go down. On some network elements, many LSPs may share the same LDP or RSVP session.

At the next lower level in the structure 40 is a routed network level, at which the testing function group 100 includes sub-groups 102, 104 for IP Unicast and IP Multicast entity testing functions 101, 103, 105. The IP Unicast testing functions 101 include ICMP (Internet Control Message Protocol)-ping and ICMP-trace functions, and the IP Multicast testing functions 103, 105 include state, info, trace, and mgmt (management) functions. The trace function may use extensions of IGMP (Internet Group Management Protocol), for example, to trace multicast traffic in the network. The state function may be supported in a similar manner as the trace function but provide a different output. The info function is used to retrieve router information relating to multicast from a neighboring router/service, and the management function is used to monitor multicast router operation.

The lowest level group 110 in the structure 40 is associated with OSI Layer 1 and Layer 2 (L1/L2) entities, including ATM entities, Frame Relay entities, POS (Packet Over SONET) entities, and Ethernet entities, each of which has a corresponding sub-group 112, 114, 116, 118. ATM-ping is shown at 111 as an example of an ATM entity testing function, and MAC-ping and MAC-trace are shown at 113 as examples of Ethernet entity testing functions. Testing functions for Frame Relay and POS entities would be included in the sub-groups 114, 116.

Not all of the sub-groups in the structure 40 of FIG. 2 include testing functions. Thus, a testing function group structure and order could be defined based on expected operational dependencies of service entities to be provided in the communication system, for example, and later used to classify testing functions as services and/or testing functions are actually configured in the communication system.

Those skilled in the art will be familiar with the various testing functions explicitly shown in FIG. 2. Although these testing functions might be available in conventional systems, these tests are not arranged in any particular manner as shown in FIG. 2. Testing functions for a particular entity could be identified and executed manually. Conventional systems do not take any sort of operational dependency between entities into account, for sorting testing functions or developing a testing plan or suite for a testable entity.

An example of a complete testing procedure based on the testing function structure 40 will be described below with reference to FIG. 3, which is a block diagram of a pair of connected communication services.

Figure 3:
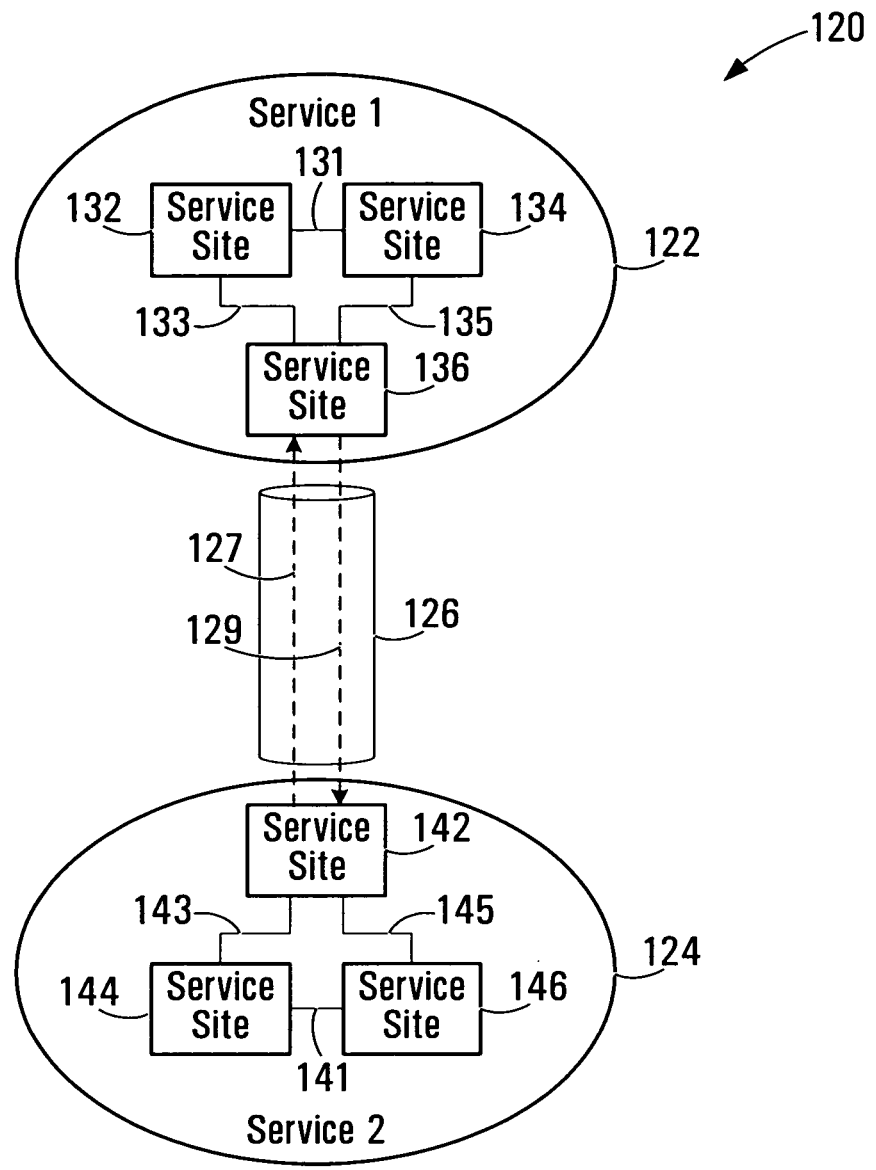
FIG. 3 is a block diagram of a pair of connected communication services.

The example multi-service system 120 of FIG. 3 includes two services 122, 124 which are operatively coupled by a connection 226, illustratively a pair of unidirectional communication paths 127, 129. The paths 127, 129 may be established by binding each service 122, 124 to the same tunnel, for example.

Each of the services 122, 124 includes multiple service sites 132/134/136, 142/144/146 which are connected to each other through mesh connections 131/133/135, 141/143/145. The service sites 136, 142 are connected via the connection 126, and the other service sites might be operatively coupled to other SAPs through which the services 122, 124 are accessible.

Suppose, for example, that the services 1 and 2 in FIG. 3 are VPLS services, and that an operator is informed that communication traffic via a particular VPLS, illustratively service 1, seems to be slower than expected. This type of performance issue could be automatically detected in some embodiments.

It might not be immediately apparent to/from/between which service sites 132/134/136 communication traffic is actually affected, where all of the sites still have their normal connectivity, for example. Instead of having to manually trace the VPLS service and its operational dependencies in the communication system, embodiments of the invention allow an operator or other personnel to select the VPLS entity itself for testing. This selection could also be an automatic function which is performed when an error or degradation affecting a testable entity is detected, and/or based on service modification (create service, add new service site, change tunnel, etc.) in order to verify the service's connectivity and performance.

Testing in this example might begin with CPE-ping functions, which test the connections between each SAP connected to the VPLS service sites and its corresponding CPE. Based on the CPE-ping functions, it might be determined that traffic in the direction from site 136 to site 142 has been degraded. Packet loss, high average round trip time between sites 136, 142, and/or outbound (site 136 to site 142) and inbound (site 142 to site 136) traffic characteristics could be indicative of a problem in this direction, on the connection 129.

With reference now to both FIGS. 2 and 3, this problem might be due to a binding between the service 122 and the communication path on which it transmits communication traffic, or on a lower level. If a service ping function indicates normal operation of the binding, then the tunnel used by the service 122 in the direction from site 136 to site 142 could very well be the source of the problem. Again, testing functions for that level could be performed. The testing functions could just cover the service transport level, or also include LSP level testing functions, and so on.

In this manner, an entity of a communication system may be associated with multiple testing function groups according to its operational dependency on other entities of the communication system. In conventional systems, such operational dependencies must be manually discovered to identify and execute the appropriate tests. Embodiments of the invention simplify this process by automatically determining testing functions for not only an entity to be tested, but also other entities which have an operational dependency with the entity to be tested. Operational dependencies may be used to move "across", "up", or "down" between entities.

Considering the above example, a VPLS would normally be associated only with the VPLS testing functions shown at 63. According to embodiments of the invention, however, a VPLS is associated not only with VPLS-specific testing functions, but also with testing functions for testing other entities having an operational dependency with the VPLS.

Figure 4:
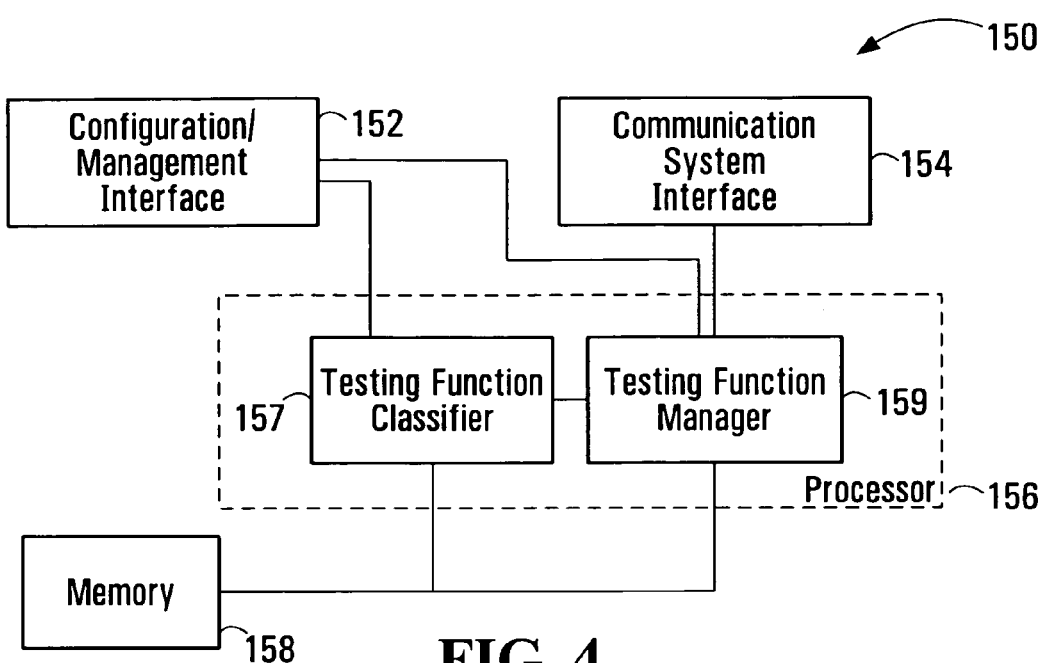
FIG. 4 is a block diagram of a management system for a communication system.

These and other testing function-related features will become apparent from the following description of FIG. 4, which is a block diagram of a management system for a communication system.

FIG. 4 shows an illustrative example management system 150, which includes a configuration/management interface 152, a testing function classifier 157 operatively coupled to the configuration/management interface 152, a testing function manager 159 operatively coupled to the configuration/management interface 152 and to the testing function classifier 157, a communication system interface 154 operatively coupled to the testing function manager 159, and a memory 158 operatively coupled to the testing function classifier 157 and to the testing function manager 159. As shown, the testing function classifier 157 and the testing function manager 159 may be implemented using a processor 156.

A management system implementing an embodiment of the invention may be provided as part of an overall management solution for a communication system, and may thus operate in conjunction with other components and functions not explicitly shown in FIG. 4. Accordingly, embodiments of the invention may include further, fewer, and/or different components which are operatively coupled in a similar or different manner than shown. In addition, the particular division of functions shown in FIG. 4 is also intended only for illustrative purposes. The functions of the classifier 157 and the manager 159 may be provided in more than two components or modules, or in a single component or module, in other embodiments.

The types of the interconnections between components of FIG. 4 will be, at least to some extent, implementation-dependent. Where the components of the system 150 are implemented in hardware, the interconnections may be provided through physical connectors such as a computer system bus. In some embodiments, at least the classifier 157 and the manager 159 are implemented in software for execution by the processor 156. In this case, the operative coupling between these components may instead be logical. For example, the classifier 157 and the manager 159 may access the same data structures in the memory 158, whereby the data structures represent a logical operative connection between the classifier 157 and the manager 159.

The configuration/management interface 152 may include one or more devices for receiving inputs from and/or providing outputs to a user. For example, a user may perform testing control/management tasks by entering or selecting information using a keyboard and mouse, and these tasks may be simplified by information presented to the user on a display. The configuration/management interface 152 may support any or all of an OSSI (Operation Support System Interface) for receiving commands and/or other inputs from another system, and a GUI (Graphical User Interface), for instance. Support for an OSSI may be provided using an interface such as an Application Programming Interface, for example, to allow external systems to interact with the management system 150.

In perhaps most implementations of embodiments of the invention, the management system 150 will communicate with a communication system. The communication system interface 154 includes a transmitter, a receiver, or both, in the form of a transceiver for instance, to enable such communications. As described in further detail below, the management system 150 may send testing and/or control signals to communication equipment in the communication system when testing functions are to be performed. The management system 150 may also receive information such as test signal responses and/or testing function results from the communication system.

Those skilled in the art will appreciate that the specific structure and operation of the communication system interface 154 is dependent upon the particular communication system and equipment with which the management system 150 is to communicate, the media and protocols used between the management system 150 and the communication system, and whether the management system 150 is to transmit, receive, or both transmit information to and receive information from the communication system.

The testing function classifier 157 and the testing function manager 159 may be implemented in hardware, in software for execution by a processor 156, such as a microprocessor, an ASIC (Application Specific Integrated Circuit), an FPGA (Field Programmable Gate Array), or other type of processing element, or in some combination of hardware and software. Although a single processor 156 is shown in FIG. 4, multiprocessor implementations are also contemplated, in which the classifier 157 and the manager 159 are implemented using more than one processing element. The other components of the management system 150 may similarly be implemented partially or entirely using hardware or software.

The memory 158 may include one or more memory devices of the same or different types. Solid state memory devices and devices for use with movable and/or removable storage media are illustrative of types of memory device which the memory 158 may include. It should also be appreciated that the memory 158 may be local to the management system 150 as shown, or a remote store at a server, for example, which is accessible by a management system. In one embodiment, the memory 78 is used to implement a database system.

In operation, the testing function classifier 157 assigns testing functions for testing entities of a communication system to one of a number of testing function groups. The testing function manager 159 associates an entity of a communication system with a group of testing functions for testing a different entity of the communication system. The association of a testable entity with a testing function group corresponding to a different entity is based on an operational dependency, if any, between the two entities, and possibly also the testing capabilities and/or other characteristics of the communication equipment which supports the testable entity. One entity may be operationally dependent on the other entity, for example, as described above.

It will also be apparent from the description of FIG. 2 for instance, that an entity to be tested may be associated with testing function groups for more than one other entity, where the entity to be tested has multiple operational dependencies. An application entity may have dependencies through a service entity, a service transport binding entity, a service transport entity, a transport entity, a routed network entity, and an L1/L2 entity. Thus, if an application entity is to be tested, such as when a user invokes a testing function by selecting a representation of the application entity in a UI, an application testing function group as well as other testing function groups may be associated with the application entity to be tested. Any or all of the associated testing function groups may be used to generate a testing plan for an entity.

Testable entities of a communication system may include, among others, communication services supported in the communication system, layers of a communication protocol stack used in the communication system, and equipment comprising the communication system.

The testing function manager 159 may select one or more testing functions from each testing function group which is associated with an entity to be tested. Through the communication system interface 154, the testing function manager 159 may transmit information to the communication system to cause each selected testing function to be performed. The transmitted information may include test signals or other information involved in actually performing tests, and/or control signals which instruct other components of the communication system to carry out the selected testing functions.

A sequence in which the selected testing functions are to be performed may also be determined by the testing function manager 159. The testing function sequence could be determined on the basis of an order of testing function groups in a hierarchy such as shown in FIG. 2. External control of testing function sequence is also contemplated. A user might enter sequence information through an OSSI, for example, with the information then being received at the system 150 via the configuration/management interface 152.

Inputs may also or instead define or modify any or all of the testing function groups, and/or select specific testing functions to be performed for a testable entity. For example, an initially defined set of testing function groups might not apply to subsequently configured testable entities, such as a new communication service. In this case, a structure of the set of testing function groups could be modified to include new sub-groups for instance, or the existing set may be replaced with a new set of testing function groups. Selection of testing functions to be performed may be useful where the testing function manager 159 is configured to automatically select all testing functions from all associated testing function groups. A user may then have final control over the testing functions to limit the number of testing functions performed by removing unnecessary or unwanted testing functions from a generated test suite.

Figure 5:
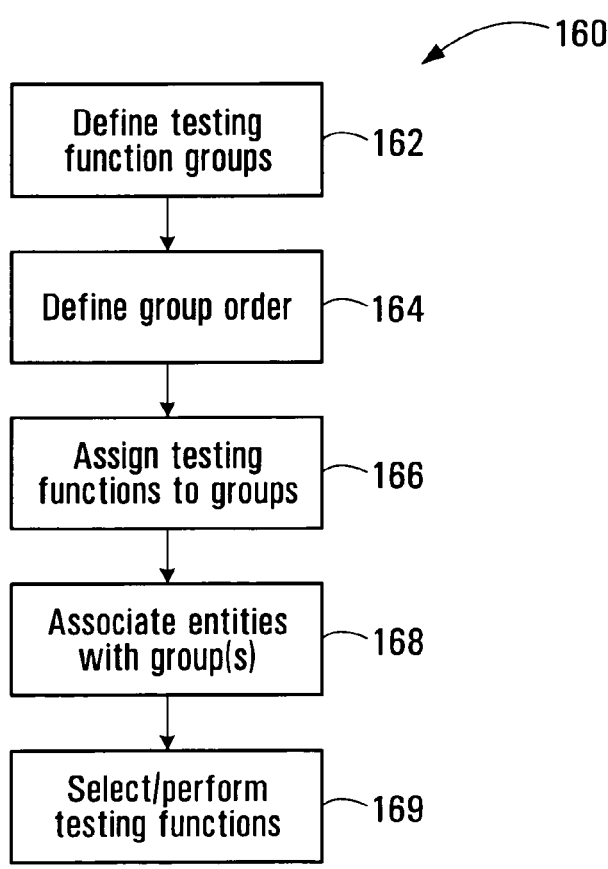
FIG. 5 is a flow diagram of a communication system testing method.

FIG. 5 is a flow diagram of a communication system testing method. The method 160 begins at 162 with an operation of defining testing function groups for arranging testing functions. The testing function groups arrange testing functions for testing respective entities of a communication system. A relative order of the testing function groups is then defined at 164 based on an order of operational dependency between the testable entities tested by the testing functions of the groups. An example of a set of testing function groups having a relative order which reflects a layered architecture of a communication system has been shown in FIG. 2 and described above.

A testing group structure may be defined at 162, 164 by a user or predefined by a manufacturer of a management system or management software, for example. Embodiments in which both types of testing group structure definition are also contemplated. As noted above for instance, a user might modify or replace an existing testing group structure for consistency with new communication services as those services are configured in a communication system. Although in many embodiments the operations at 162, 164 would be performed only once, the present invention in no way precludes definition of new testing group structures or modification of an existing testing group structure.

At 166, testing functions are classified, that is, assigned to the testing groups. A testing function may be classified manually by a user or automatically by a management system based on the particular entity it is intended to test. Some testing functions may be capable of testing different entities at different architectural or protocol levels of a communication system, and therefore may be assigned to multiple groups. Referring to FIG. 2, for example, a MAC-ping function may be used to test VLL, VPLS, VLAN, and Ethernet entities, and thus is assigned to multiple testing function groups 60, 110 and sub-groups 62, 64, 69, 118. Although a MAC-ping function would be configured somewhat differently to test these different entities, with different source and destination addresses, for example, the testing function itself operates in substantially the same way for testing all these entities.

The method proceeds at 168 with an operation of associating an entity of a communication system with a group of testing functions for testing another entity of the communication system. This is based on an operational dependency, if one exists, between the entity and the other entity. Operational dependencies may be detected from configuration information stored in a database in the memory 158 (FIG. 4), for example. Analysis of configuration information can reveal whether and how an entity, illustratively a communication service, is dependent upon connections between its own service sites and/or other entities, whether and how those connections are dependent on any underlying technologies, and so on, down to the lowest physical components upon which transfer of communication traffic is dependent. Operational dependencies may also or instead be traced in the opposite "upward" direction to build associations between entities and testing function groups.

Testing functions are then selected at 169 from each testing function group associated with an entity to be tested, and any or all of the selected testing functions may also be performed in the communication system. The final selection of testing functions to be performed may be dependent upon inputs such as inputs received from a user. Testing functions may be removed from or added to a list of automatically selected testing functions, for example. The sequence in which selected testing functions are to be performed may similarly be determined automatically and/or based on inputs.

It should be appreciated that the method 160 of FIG. 5 is intended solely for illustrative purposes and does not limit the scope of the present invention. Embodiments of the invention may involve further, fewer, or different operations which may be performed in a similar or different order than shown. Various ways of performing the operations shown in FIG. 5, and further operations which may be performed in some embodiments, will be apparent to those skilled in the art from the foregoing description of FIGS. 2, 3, and 4. Other variations are also contemplated.

For example, a sequence of testing functions for an entity might be invoked automatically in accordance with a predetermined schedule. A service provider may wish to periodically test a communication service to ensure that SLAs (Service Level Agreements) are being met. Manually invoked testing function sequences are also possible, wherein a user could select a testable entity from a displayed representation of a communication system for instance.

Another possible feature which may be provided in some embodiments is variable testing function sequences. Testing function sequences might not necessarily specify only an order in which testing functions are to be performed. A sequence may include one or more sequence conditions, such as to cause the sequence of testing functions to be halted if a testing function confirms normal operation of an entity. In this case, normal testing function results might indicate that the root cause of a problem lies in a previously tested entity, where a testing function sequence moves "down" through the architectural levels of a communication system. An analogous testing function sequence condition may cause a testing function sequence to proceed with execution of a next testing function in the sequence if a current testing function indicates an error in operation of an entity. A branch condition could also or instead be included in a testing function sequence. This type of condition would cause selection of a next testing function from several possible testing functions based on a result of a current testing function.

Subsequent actions which may be performed when results of testing functions become available include analyzing the results of any or all testing functions and providing a representation of results of one or more testing functions. These actions could be specified, for example, in a set of predetermined or user-defined rules. Result processing rules may be established for each architectural/testing level, for each entity type, or for particular testable entities. Combinations of these rule types may also be possible, to establish a default set of rules for communication service entities and a set of specific rules for VPLS entities, for example.

User control of these rules is also contemplated. In some embodiments, rule set modification may be provided in a similar manner to user testing function selection and/or sequence control, whereby a user might remove or add rules to a rule set for instance.

FIG. 6 is a block diagram of a UI for defining and managing a testing policy. A testing policy is an example of one possible mechanism for designing a testing plan for testable entities, and includes a set of testing function definitions and processing rules. A common testing policy may be defined and later referenced when entities of the type for which the policy has been defined are to be tested. In general, a policy is associated with an entity type, which constrains the testing functions applicable to the policy.

It should be appreciated that the present invention is in no way restricted to the particular UI 170 shown in FIG. 6, or other UIs shown in subsequent Figures. Different layouts, information, and/or functions may be displayed to a user to facilitate configuration and management of testing functions for a communication system. It should also be appreciated that these tasks could be enabled through other types of interface than graphical user interfaces, such as XML (extensible Markup Language) configuration, OSSIs, etc.

Testing functions for a policy can be defined individually by the policy creator or using testing function templates, which include information relating to particular types of testing function such as MAC-ping. Any undefined parameters in the templates may be defined during policy configuration.

Processing rules may specify such testing function control parameters as an order of testing function execution, how testing functions results are to be processed, and/or how the results are to be presented. More complex processing rules could specify sequence conditions and actions, such as those noted above. These rules, like testing functions, could be based on predefined templates to simplify configuration of rules for a testing policy.

The UI 170 shown in FIG. 6 could be displayed to a user upon selection of a create policy, edit policy, delete policy, or other policy-related function at a management system. From a list of existing testing policies, for example, a user might select a policy to edit.

As shown, the UI 170 presents general policy information. A user may switch between a display of general information, rule information, and bound entities information for a policy by selecting the tabs 172, 174, 176. The processing rules tab 174 would cause processing rules for a policy to be displayed, and the bound entities tab 176 would display an indication of each testable entity with which the policy has been associated. Testing functions for a testable entity may be generated based on a policy to which the entity has been bound. Functions may also be provided through the tabs 174, 176 to modify the set of rules and/or bound entities for a testing policy.

The general policy information includes a policy name 178. The policy name 178 may be entered when a policy is first configured and/or modified when a policy is edited. The policy identifier 180, however, is preferably a unique identifier which is automatically assigned.

A description of a test policy may be entered at 182, such as to provide a summary of the purpose of the policy.

The entity type 184 may be automatically populated when a policy creation function is invoked for a specific testable entity, such as by selecting the entity in a representation of a communication system or selecting a create policy or analogous function in a UI which presents information related to the entity. Otherwise, the entity type 184 may be entered by a user or selected from a pulldown menu, for example. Valid values for the entity type 184 include any values which indicate a testable entity. Referring back to FIG. 2, the entity type 184 may include specific service types (VLL, VPLS, IES, MPLS/BGP VPN, VLAN), service transport binding types (circuit), service transport type (tunnel), transport type (LSP, LDP, RSVP, GRE), routed network type (IP Unicast, IP Multicast), or L1/L2 type (ATM, Frame Relay, POS, Ethernet).

From the general information shown at 178, 180, 182, 184, a user would know that the presently displayed policy is named "VPLS Policy #3", has an ID of 50, and has been defined for a VPLS service entity type.

Information for the specific testing functions of the policy is displayed at 186, 188. The headings at 186 allow a user to determine which parameters for each testing function are displayed at 188. The list of testing functions at 188 includes testing functions from multiple testing function groups. In the example testing function group structure of FIG. 2, the MAC-ping and LSP-ping functions belong to different testing function groups 60, 90, but are displayed to a user at the same time in the UI 170.

From the entity type 184 and the operational dependencies of such entities in a communication system, a set of testing functions may be automatically selected and displayed at 188.

The UI 170 also includes functional visual elements for invoking various actions for testing functions and/or the testing policy as a whole. In respect of testing functions, for example, the element 192 allows a user to add a new testing function to the testing policy. A testing function could be added to a policy by creating a new testing function manually or from a template, or by selecting from a list of testing functions which are applicable for the entity type 184. The element 194 allows a user to edit a testing function in the testing policy. A testing function may be removed from the testing policy by selecting the testing function and then selecting the element 196, for instance. In the example UI 170, an order in which testing functions are to be performed may be changed by moving testing functions up or down in the list 188 using the elements 198, 199, respectively.

The tasks which may be accomplished by selecting the elements 192, 194, 196, 198, 199 need not necessarily be mutually exclusive. For example, a testing function might be temporarily removed from a policy by editing the testing function to change a flag or other parameter. In this case, the testing function is effectively removed from the testing policy, albeit for different durations (i.e., permanently or temporarily), using either the edit or remove element 194, 196.

The "Update Test Suites" element 202 causes a test suite, which is a collection of testing functions for a specific testable entity, to be generated using the testing policy. Selection of the element 202 may cause respective test suites to be generated for any or all of the entities bound to the policy. Generation of a test suite may involve such operations as determining a specific entity to be tested and a testing function source and destination.

Selection of the reset element 204 resets at least user entered information in the UI 170. An "OK" function invoked by selecting the element 206 accepts user inputs and may close the UI 170, whereas an apply function invoked by selecting the element 209 may accept user inputs without closing the UI 170. A cancel function invoked by selecting the element 208 ignores any information currently entered or changed by a user and may also close the UI 170.

The UI 170 relates to a testing policy for a specific type of testable entity, which in the example of a VPLS entity and the testing function group structure of FIG. 2, corresponds to a sub-group of a testing function group. Policies may also or instead be defined on a per-level basis, with appropriate testing functions for each entity type at a level being identified during test suite generation. An "Application" type testing policy might include testing functions for all application entity types, and then the appropriate testing functions for a specific application entity could be selected when a test suite is generated for that entity.

Figure 7:
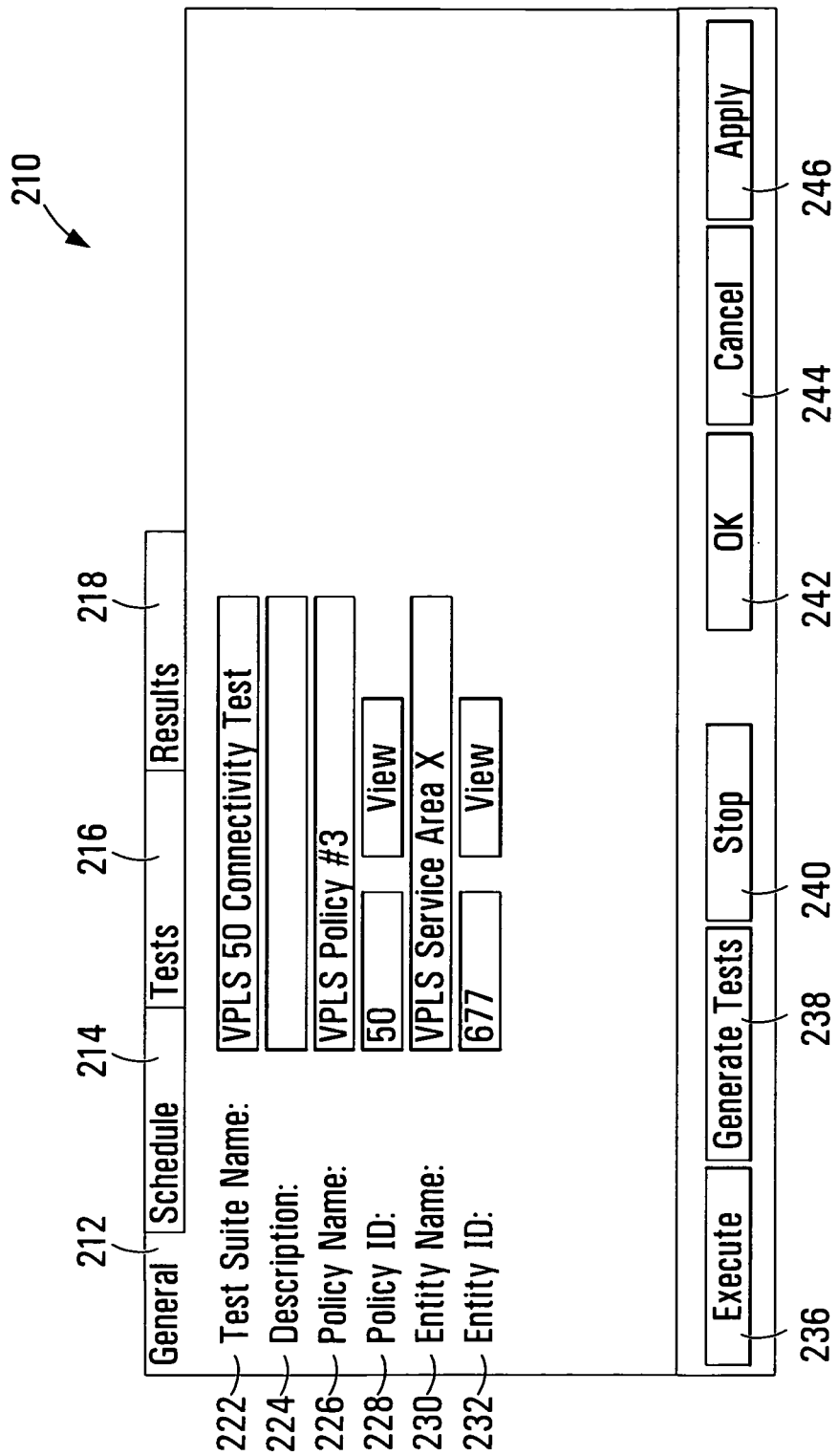
FIG. 7 is a block diagram of an example test suite UI.

FIG. 7 is a block diagram of an example test suite UI. A test suite allows the specification of multiple testing functions from various testing function groups using a single schedule. The results of different testing functions on different architectural levels can also be displayed on the same graph for easy visualization.

The UI 210 could be displayed to a user upon selection of a test suite management function from a general communication system management screen or a screen such as a configuration form associated with a testable entity in the communication system, for example.

General information for a test suite is accessible through the general tab 212 and shown in the UI 210. The general information for a test suite includes a user-defined test suite name 222, a description 224, a name and ID 226, 228 of a testing policy from which the test suite was created, if applicable, and a name and ID 230, 232 of the entity for which testing functions in the test suite are to be performed.

Not all test suites are necessarily generated from a testing policy. Test suites may also or instead be manually configured by a user, or automatically configured by determining the entity to be tested and the applicable testing functions for that entity. A testing policy is one, but not the only, mechanism through which an entity may be associated with testing function groups and testing functions. Information indicating entity types, for example, may be stored with both testing function definitions and entity data records to thereby allow testing functions to be associated with entities.

Details of an entity, and a testing policy if one was used to generate the test suite, may be viewed by selecting the view elements of the UI 210.

Selection of the execute element 236 causes the test suite to be executed in the communication system. The element 238 generates the actual testing functions which are to be performed, based on testing function definitions and parameters of the entity to be tested, if this has not already been done through the testing policy UI of FIG. 6, described above. The stop element 240 stops execution of the test suite, if it is currently executing.

The tasks supported by the elements 242, 244, 246 have been described above with reference to the elements 206, 208, 209 of the UI 170 (FIG. 6). In the UI 210 of FIG. 7, however, these tasks would be performed for a test suite.

The schedule tab 214 is used to view and configure the schedule for a test suite. A test suite schedule may include sequence information and/or time information. Testing function sequences have been described above. Test suite time information may include one or more dates and times at which the test suite is to be executed. A time interval between two consecutive testing functions in the test suite, and/or between repeat executions of the test suite may also be specified. An option of selecting a test count (the number of times the test suite is repeated) and/or the duration of the test suite execution (i.e., test count=(Integer) duration/interval) may also or instead be provided.

A listing of testing functions of a test suite is accessible through the tests tab 216. In some embodiments, the listing is similar to the listing shown at 188 (FIG. 6), and similar testing function-related tasks as shown in FIG. 6 are provided.

The results tab 218 allows a user to view results of testing functions of a test suite, and possibly an overall result of the test suite. A summary state of the test suite, for example, may indicate a state of the test suite based on the last execution of all testing functions of the test suite, as "Success" or "Failure", for example. A success state might be indicative of a normal result for each testing function of a test suite, whereas a failure state might indicate that one or more of the testing functions of the test suite did not return a normal result. The success or failure of a ping test, for example, may be determined on the basis of whether or not a response signal is received from all destinations, the timing of response signals, etc. Success/failure criteria may be different for different testing functions, and are generally dependent on testing function type.

User configurable criteria such as thresholds may also or instead determine testing function and/or test suite failure or success. A user might specify that jitter greater than a configured value, for instance, should be deemed a testing function failure. A test suite threshold could be similarly configured where a user wishes to specify how many testing functions, if any, may fail without also declaring failure of the test suite. This type of test suite threshold could be specified as a number of testing functions or some fraction or percentage of the number of testing functions in the test suite.

Per-testing function results may also be available through the results tab 218.

Figure 8:
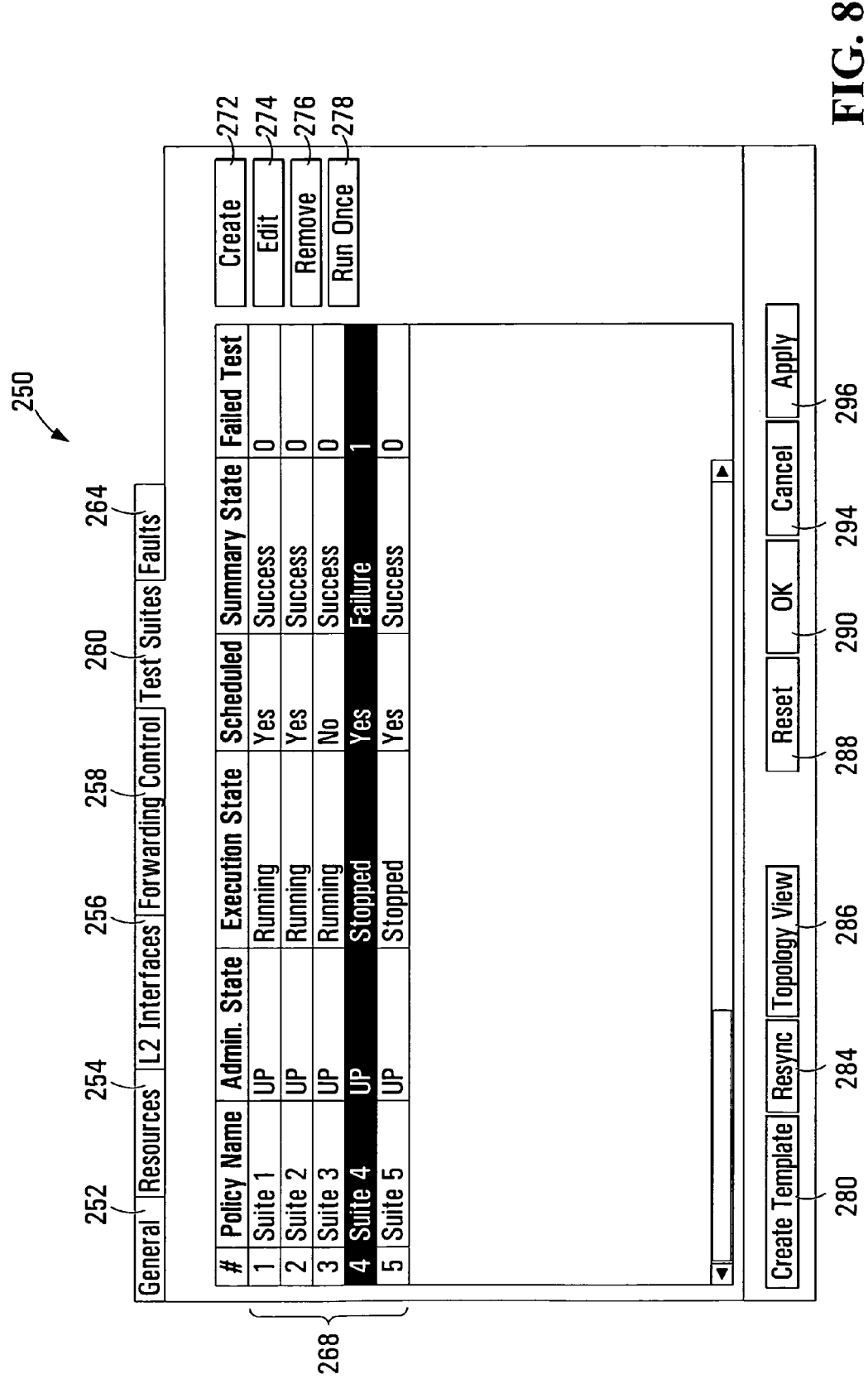
FIG. 8 is a block diagram of an example UI in which test suites for an entity are displayed.

FIG. 8 is a block diagram of an example UI in which test suites for an entity are displayed. The UI 250 includes a list 268 of test suites configured for a particular testable entity. Test suites may be created, edited, removed, or executed by selecting the elements 272, 274, 276, 278. Policy names, states, and result information for each test suite are shown under the test suites tab 260.

Other information for an entity is also accessible through the tabs 252, 254, 256, 258, 264. Although the information accessible through these tabs might not be directly involved in testing function-related aspects of the present invention, these other tabs are illustrative of the types of information which may be stored in a database and accessed by various components of a management system, presented to a user, specified by a user, and/or modified by a user.

Figure 9:
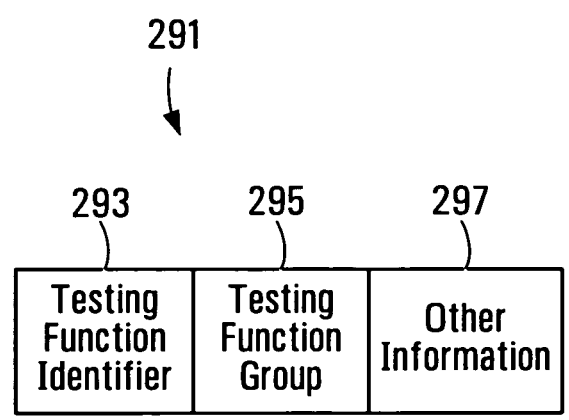
FIG. 9 is a block diagram of a testing function data structure.

FIG. 9 is a block diagram of a testing function data structure. The data structure 291 includes a testing function identifier 293, such as a testing function type identifier and/or unique identifier used in a management system, information 295 identifying a testing function group to which the testing function has been assigned, and other information 297, which may include information identifying the entity type(s) to which the testing function is applicable, for example.

The data structure 291 represents an illustrative example of the manner in which information relating to a testing function might be stored in a memory. A data structure implemented in an embodiment of the invention may include further, fewer, or different information fields than those explicitly shown. The definition of a testing function or a pointer or other link to the definition, for instance, might also be stored with a data record having the general format shown in FIG. 9. When a testing function is configured for a specific testable entity, information associated with that entity and/or other configuration information may also be stored with testing function-related information in a single data structure or a different data structure.

In general, some indication is provided regarding to which testing function group(s) a testing function belongs. This information may take the form of a group identifier in a testing function data record such as 291. Group assignment may also or instead be indicated in a representation of the testing function group structure, in a table formatted as shown in FIG. 2 for instance. In this case, testing functions of a testing group are identified in appropriate portions of a table or other data structure.

One possible application of aspects of the present invention is to test component communication services which have been configured to operate together to provide a composite communication service. The number of entities, possibly of different types, and hence the number of different test types, and differences in testing capabilities of different communication equipment types involved in providing a composite communication service make testing function provisioning a very challenging and time consuming task. The techniques disclosed herein can be applied to simplify the testing of composite communication services, such as where the connectivity of various points in a communication system and/or the quality of service of various tunnels should be regularly verified. Multiple testing functions/suites for entities involved in a composite communication service can be combined to be run under one schedule. Composite communication service testing aspects of the present invention are described in further detail below.

Figure 10:
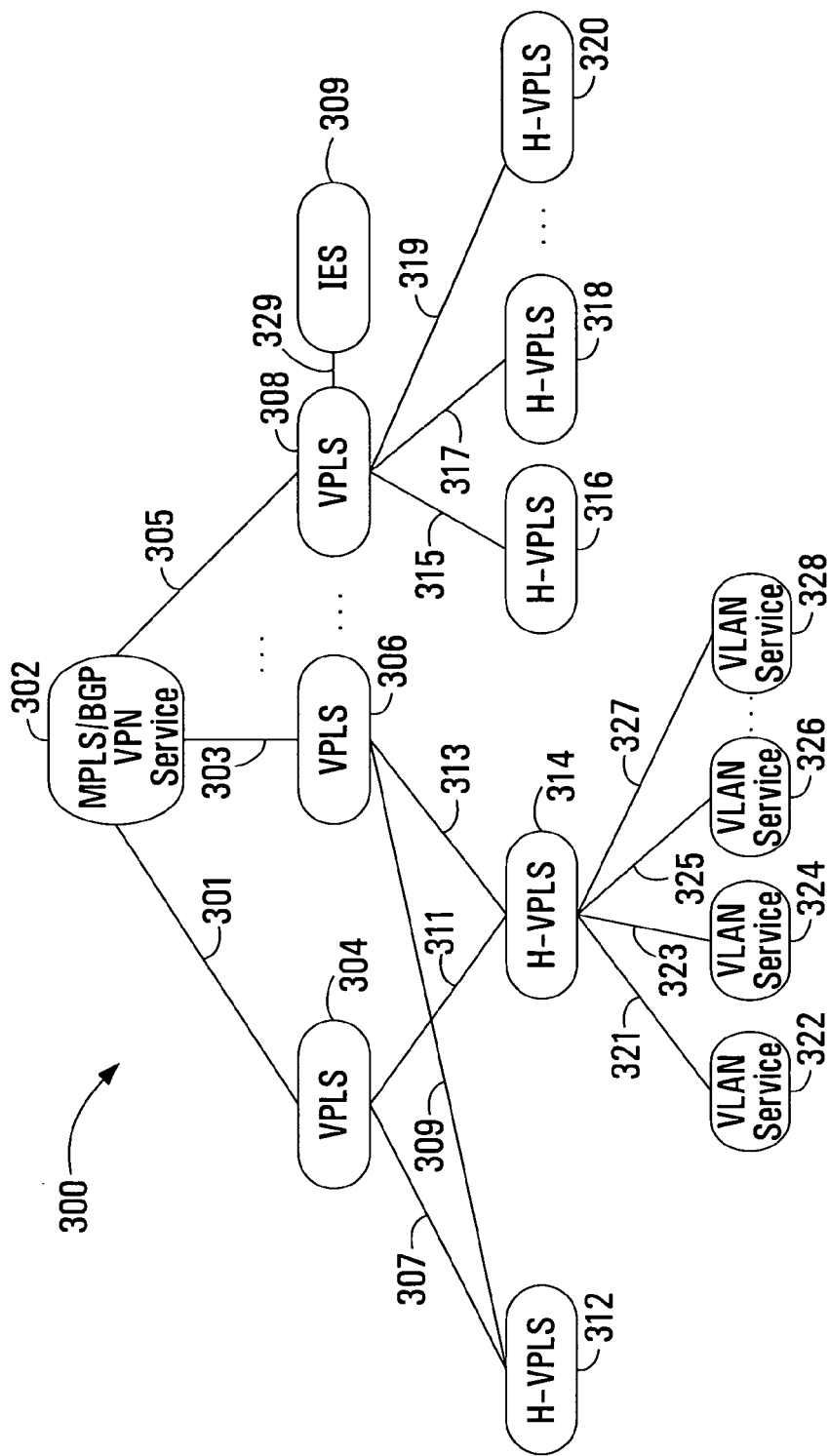
FIG. 10 is a block diagram illustrating component communication services involved in providing a composite communication service.

FIG. 10 is a block diagram illustrating component communication services involved in providing a composite communication service. In FIG. 10, a composite communication service 300 is provided by multiple component communication services of different technologies, including an MPLS/BGP VPN service 302, VPLSs 304, 306, 308, an IES (Internet Enhanced Service) 310, H-VPLSs (Hierarchical VPLSs) 312, 314, 316, 318, 320, and VLAN services 322, 324, 326, 328. Also shown in FIG. 10 are service connectors 301, 303, 305, 307, 309, 311, 313, 315, 317, 319, 321, 323, 325, 327, 329, which represent operative connections between communication services. Other composite communication services may include fewer, further, or different component communication services than those shown.

A component communication service, also referred to herein as a communication service or component communication service, may be configured to provide a composite communication service. In some embodiments, a component communication service is configured to operate with other component communication service to provide a composite communication service. Illustrative examples of component communication services include the services shown in FIG. 10, with which those skilled in the art will be familiar.

The blocks shown in FIG. 10 provide a service-level view, as opposed to the combined equipment- and service-level view of FIG. 1, of a composite communication service. In terms of implementation, a VPLS, for example, might consist of one or more VPLS service sites operatively coupled to each other. A service site represents a service object in a network element, such as a VLL (Virtual Leased Line) service site or a VRF (Virtual Routing and Forwarding) service site of an MPLS/BGP VPN, or a VLAN object, for instance. A service may include multiple service sites. A VLL service site or a VPLS service site of a VPLS service can be operatively coupled or "connected" to one or more service sites of another VPLS service.

Those skilled in the art will be familiar with MPLS/BGP VPN, VPLS, H-VPLS, and VLAN services as shown in FIG. 10.

Considering a video/TV broadcast application for example, the MPLS/BGP VPN 302 may use PIM (Protocol Independent Multicast) and IGMP to distribute TV channels to various metro Ethernets, shown in FIG. 10 as the VPLSs 304, 306, 308. Traffic is further broadcast to different areas of each city using H-VPLSs 312, 314, 316, 318, 320. Low cost L2 switches or DSLAMs could be used at the last mile to implement the VLAN services 322, 324, 326, 328 in different ring groups or in different DSLAMs, for delivery of TV content to subscribers of the composite TV service.

The component communication services of the composite communication service 300 are operatively coupled to each other using service connectors, represented in FIG. 10 at 307, 309, 311, 313, 315, 317, 319, 321, 323, 325, 327, 329. Each service connector shown in FIG. 10 represents a logical link between two component communication services.

Different types of service connector may be employed to operatively couple the services together to provide the composite TV service. For example, interface to interface service connectors may be used between the VLAN services 322, 324, 326, 328 and the H-VPLS 314, and also between the MPLS/BGP VPN service 302 and the VPLSs 304, 306, 308. PW connectors may be used both to interconnect "satellite" H-VPLSs 312, 314, 316, 318, 320 and the VPLSs 304, 306, 308. Another type of service connector, referred to herein as a cross-connect, may be used between services having service sites located in the same communication equipment, such as the VPLS 308 and the IES 310.

As will be apparent from the foregoing, a composite communication service is basically a set of communication services, supported in a communication system, some of which may have been configured to operate together. Service connectors are used in some embodiments to configure the communication services to operate together so as to provide the composite communication service.

The composite communication service 300 represented in FIG. 10, for instance, involves MPLS/BGP VPN, VPLS, H-VPLS, and VLAN technologies and interconnections between those technologies. Management of these interconnections using conventional management systems is difficult in that network operators or other management personnel could not easily identify relationships between communication services. A management system may provide a representation of a composite communication service in which relationships between a communication service, a composite communication service, and any other communication services configured as part of the composite communication service, are clearly indicated.

As noted above, although a composite communication service and its component communication service(s) are supported by equipment in a communication system, the concept of a composite communication service itself may be unknown to the communication system, outside of a management system used to manage equipment and services of the communication system. Thus, the ability to manage composite communication services need not be disrupted by changes in the communication system. For instance, rules may be established for composite communication service creation, deletion, modification, and/or presentation. These rules can be enforced at the management system to prevent improper service connections from being added or to alert service management personnel to changes that have been made to the communication system in the field and affect a composite communication service, for instance. In the latter case, management personnel may then take appropriate action, to modify component communication services and/or connectors of the affected communication service. An improper connector may reflect incorrect configuration of component communication services, for example, which can be remedied by changing how the component communication services have been configured to operate with each other.

Despite the challenges of managing composite communication services, it may in many instances be desirable to configure multiple communication services, within or beyond the scope of a managed communication network or portion of a communication system, to provide a composite communication service. The component communication services may be of similar or different types.

Multiple VLAN services on different bridged networks, for example, could be connected to an H-VPLS. The VLAN service and the H-VPLS can be configured for operation with each other by creating an SCP (Service Connection Point) to SCP service connector using a management system. An SCP to SCP service connector is one type of service connector according to an embodiment of the invention, which may be used to configure component communication services to provide a composite communication service. SCP to SCP service connectors may also be used to configure other types of communication service than VLAN and H-VPLS, such as to connect VPLSs to a MPLS/BGP VPN service as shown in FIG. 10, or vice versa.

An SCP to SCP connector specifies a logical link between two SCPs. An SCP is a service interface through which a communication service is accessible at a service provider "side" of a service, as opposed to a user or subscriber side of the service which is accessible through an SAP. In relation to the physical communication system, the SCP to SCP logical link could run over a cable such as an Ethernet cable or over a network using FR (Frame Relay) or ATM (Asynchronous Transfer Mode), for instance.

As another example, it may be desired to provide a private data service with high speed Internet access. Such a private data service could be provided by bridging multiple L2 service sites, which provide L2 data services, via a VPLS instance. This could be achieved by SCP to SCP connectors described above, or through other types of service connector, including PW spoke connectors or, where the services which are to provide the composite private data service are supported on the same communication equipment, configurable cross-connectors.

PW spoke connections in a communication system may be used to create H-VPLS services, or to connect an IES and a VPLS. In one embodiment, a PW spoke is established by logically binding a communication service to a communication path. Where traffic in a binding is unidirectional, from the service to a communication tunnel for instance, a binding may be created at each endpoint service site to support bidirectional communications between services.

In some cases, multiple communication services may be may be supported on the same piece of equipment. For example, a single service router may incorporate multiple SAPs. Physical connections between such services could be made through a local cable connection or a configurable connection device, for instance. Whereas a cable would generally be installed between communication equipment ports or interfaces after deployment of communication equipment, when inter-SAP connections are to be established, a configurable connection device could be pre-installed on an equipment backplane, for example, and subsequently configured, from a management system at a remote location for instance, to connect equipment ports/interfaces.

It is expected that physical connections between communication equipment in the communication system, through which logical connections between communication services are established, will be either installed or already in place before communication services are configured to operate together to provide a composite communication service. If necessary, new physical connections may be installed to support inter-operation between services. Once any required physical connections have been installed or configured, as in the case of a configurable connection device for instance, composite communication service configuration may proceed.

Configuration of communication services and configuration of service connectors may be performed separately or effectively as part of the same process. A management system, for example, may provide multiple interfaces for managing communication services. The same communication equipment and services may be controlled through a CLI (Command Line Interface), an OSSI, and also through a GUI for instance. A composite communication service could be set up by entering a name for the composite communication service, specifying component communication services related to the composite communication service, and configuring service connectors to create logical associations or relationships between the component communication services. Actual configuration of the communication system to implement the logical associations specified in the service connectors may then be performed either manually, such as through the CLI, OSSI, or GUI, or automatically by the management system. The latter approach may generally be preferred, in that the entire composite communication service is then manageable as a single entity. Separate tasks for configuring each of the component communication services are then avoided.

Regardless of the configuration method, manual or automatic, a composite service may thereafter be managed as a single entity.

In one embodiment, the actual configuration of a composite communication service in the communication system involves causing equipment at the endpoints of a communication tunnel to exchange control signalling to set up unidirectional service to tunnel bindings in opposite directions so as to enable bidirectional communication between services through the tunnel.

Accordingly, although the communication system itself might not be "aware" of the concept of a composite communication service, management of a composite communication service through its component communication services and/or service connectors may have an effect on configuration of equipment and services in the network.

In a similar manner, communication system configurations which affect a composite communication service may be automatically detected and reflected at a management system. Configuration of two communication services to operate together may be detected and reflected in a composite communication service management GUI, for example.

Further details of composite communication services are disclosed in the above-referenced related patent applications.

In terms of testing a composite communication service, composite communication services provided in a communication system may also be testable entities.

For a composite communication service, each component communication service is identified, by accessing a composite communication service data structure stored in memory for instance. Testing functions for each component communication service are then selected, possibly from multiple testing function groups and/or sub-groups, based on operational dependencies of the component communication services. Other entities of a communication system may involve similar operations, to identify entities with which an entity to be tested has operational dependencies, for example.

The sequence in which selected testing functions are to be performed may be based on one or more of relationships between the component communication services, operational dependencies between the component communication services and other entities of the communication system, and user inputs specifying a testing function sequence.

Figure 11:
FIG. 11 is a block diagram of a data structure representing a composite communication service.
Figure 12:
FIG. 12 is a block diagram of a data structure representing a service connector of a composite communication service.
Figure 13:
FIG. 13 is a block diagram of a data structure representing a component communication service of a composite communication service.

FIGS. 11-13 are block diagrams of data structures in which information representing a composite communication service, a service connector, and a component communication service, respectively, may be stored. These data structures may be stored in the memory 158 of the system 150 (FIG. 4), for example, and updated as necessary to keep management system records accurate and current.

As noted above for the other drawings, FIGS. 11-13 present example data structures solely for the purposes of illustration.

The composite communication service data structure 340 includes information 342 such as a name and/or ID which identifies a composite communication service, information 344, 346 respectively identifying n component communication services of the composite communication service, such as a composite communication service name and/or ID, and other information 348 associated with the composite communication service, illustratively any or all of a description, aggregate operational state, number of composite communication services, and number of connectors. The component communication services of a composite communication service may thus be determined by accessing the information in fields 344, 346 when a composite communication service is to be tested.

The service connector data structure 350 includes information 352 such as name and/or ID identifying the service connector, information 353 indicating a type of the service connector, examples of which have been described above, information 354 such as name and/or ID identifying the composite communication service to which the service connector belongs, information 356, 358 such as name, ID, service site, and/or interface identifying the m endpoints connected by the service connector, and other service connector information 359, such as a state of the service connector. Although it is expected that service connectors will connect two communication services, one contemplated variation of the service connector concept is to define interconnections between more than two services.

The endpoint information provided at 356, 358 may include, for each communication service connected by the service connector, information identifying the communication service, a particular service site of the communication service, and connection information. A service connector which connects two services, services 1 and 2, for example, might include in the fields 356, 358 the data (Service ID 1, Service Site ID 1, SCP/bindingID/connection device ID 1) and (Service ID 2, Service Site ID 2, SCP/bindingID/connection device ID 2), respectively.

The service connector data structure 350 may also be useful to determine which component communication services are to be tested, where testing of only a portion of a composite communication service is required, for example. Interconnections between component services can be detected through service connectors represented by data structures having the format shown in FIG. 12.

A component communication service is specified in the data structure 360 by a service identifier 362, which is information such as a name and/or ID identifying the communication service, a composite communication service identifier 364 which includes information identifying the composite communication service to which the service belongs, a composite communication service tier 366 indicating the tier or hierarchical level of the composite communication service to which the service has been assigned, and other information 368 such as service state, which may be determined from testing functions executed for the communication service.

The composite communication service tier 366 represents a level of the component communication service in a structure of the composite communication service, and not necessarily a level in a testing function structure. Comparing FIGS. 2 and 10, MPLS/BGP VPN and VPLS services appear in the service level of the testing function group structure 40 of FIG. 2, but at different levels in the composite communication service 300 of FIG. 10. However, it should be appreciated that communication system architecture or testing function level of a communication service may be indicated in a similar manner, using a testing level identifier or an entity type identifier, for example.

Data records stored at a management system may include more than one of the data structures shown in FIGS. 11-13. A management system database may include one or more composite communication service data records embodying the data structure 340, one or more service connector data records embodying the data structure 350, and one or more communication service data records embodying the data structure 360.

In short, embodiments of the invention may implement more intelligence in testing function pre- and post-processing stages to simplify such complicated tasks as communication system testing and SLA management. The problem of determining the root cause of service performance issues is also addressed by embodiments of the invention.

The techniques disclosed herein may be of assistance to an operator and other personnel in performing tedious tasks of setting up specific testing functions for various components. The available tests can be classified into different groups and levels in a testing function group structure. Testing functions at a higher level could be performed first, followed by lower level testing functions if necessary. Criteria can be defined to instruct a policy or testing engine to run a next testing function or set of testing functions based on the outcome of previous testing functions. Testing functions at the same or different levels can be packaged together with rules in some embodiments to form testing policies.

Embodiments of the invention may also help service providers to be more proactive with service assurance by allowing test suites to be scheduled. MAC-ping tests, for example, could be run to verify connectivity among all L2 SAPs, also to check if delay and jitter parameters of a service are within acceptable thresholds. A testing function sequence could be configured such that testing functions at lower testing levels are not run if the QoS targets of a current level are met. Similar arrangements could be implemented for a transport level, and/or other levels, for instance.

Testing functions created from a test suite may be persisted or created "on the fly" at execution time. As a complete set of testing functions derived from a test suite may be more extensive than the needs of a system operator, embodiments of the invention may provide for user control over the specific testing functions which will be performed. A test suite could be used to generate all possible testing functions for an entity to be tested, and then unnecessary or unwanted testing functions could be deleted either permanently or temporarily, as described above. Where the testing functions in a test suite have been modified, it may be desirable to have the testing functions persist to avoid having to remove testing functions when the same entity is to be tested again. On the fly test creation, on the other hand, may help reduce the size of a testing database, and ensure that newly added entities which are related to an entity to be tested are also tested.

What has been described is merely illustrative of the application of principles of embodiments of the invention. Other arrangements and methods can be implemented by those skilled in the art without departing from the scope of the present invention.

For example, some of the testing scenarios described above refer to traversing a system/testing group structure from higher to lower levels. The invention is not in any way limited to this or any other specific traversal order.

Embodiments of the invention may also provide further composite communication service-related features than those described herein, including features disclosed in the above-referenced related patent applications.

It should also be appreciated that variations in the manner of implementing embodiments of the invention are contemplated. Although described primarily in the context of methods and systems, the techniques disclosed herein may also or instead be implemented as instructions stored on a machine-readable medium, for example.

We claim:

1. A system comprising:
a testing function classifier configured to assign, to respective testing function groups of a plurality of testing function groups, testing functions for testing operation of entities of a communication system; and
a testing function manager operatively coupled to the testing function classifier and configured to: associate an entity of a communication system with multiple testing function groups of the plurality of testing function groups by associating the entity with a group of testing functions for testing operation of the entity and further associating the entity with a group of testing functions for testing operation of another entity of the communication system based on an operational dependency between the entity and the other entity; cause a testing function in the group of testing functions for testing operation of the entity to be performed in the communication system; and cause a testing function in the group of testing functions for testing operation of the other entity to be performed in the communication system based on determining that the testing function for testing operation of the entity indicates an error in operation of the entity,
at least the testing function manager being implemented using hardware,
wherein the entities comprise one or more of: communication services supported in the communication system, and layers of a communication protocol stack used in the communication system.

2. The system of claim 1, further comprising:
a communication system interface, operatively coupled to the testing function manager, for transmitting information to the communication system,
wherein the testing function manager is further configured to cause testing functions to be performed in the communication system by transmitting information to the communication system.

3. The system of claim 1, further comprising:
an interface for receiving one or more of: inputs to define one or more testing function groups of the plurality of testing function groups, inputs to control which testing functions are to be performed in the communication system, inputs to control a sequence in which testing functions are to be performed in the communication system, inputs to specify an entity to be tested, and inputs to specify other entities having an operational dependency with an entity to be tested, for which testing functions are to be selected.

4. A system comprising:
a testing function classifier configured to assign, to respective testing function groups of a plurality of testing function groups, testing functions for testing operation of entities of a communication system; and
a testing function manager operatively coupled to the testing function classifier and configured to: associate an entity of a communication system with multiple testing function groups of the plurality of testing function groups by associating the entity with a group of testing functions for testing operation of the entity and further associating the entity with a group of testing functions for testing operation of another entity of the communication system based on an operational dependency between the entity and the other entity; cause a testing function in the group of testing functions for testing operation of the entity to be performed in the communication system; and cause a testing function in the group of testing functions for testing operation of the other entity to be performed in the communication system based on determining that the testing function for testing operation of the entity indicates an error in operation of the entity,
at least the testing function manager being implemented using hardware,
wherein the plurality of testing function groups comprise a testing function group having a plurality of testing function sub-groups for including testing functions that test operation of entities of respective different types.

5. The system of claim 4, wherein the entities tested by testing functions in one or more sub-groups of a testing function group have different operational dependencies than entities tested by testing functions in other sub-groups of the testing function group.

6. A system comprising:
a testing function classifier configured to assign, to respective testing function groups of a plurality of testing function groups, testing functions for testing operation of entities of a communication system; and
a testing function manager operatively coupled to the testing function classifier and configured to: associate an entity of a communication system with multiple testing function groups of the plurality of testing function groups by associating the entity with a group of testing functions for testing operation of the entity and further associating the entity with a group of testing functions for testing operation of another entity of the communication system based on an operational dependency between the entity and the other entity; cause a testing function in the group of testing functions for testing operation of the entity to be performed in the communication system; and cause a testing function in the group of testing functions for testing operation of the other entity to be performed in the communication system based on determining that the testing function for testing operation of the entity indicates an error in operation of the entity,
at least the testing function manager being implemented using hardware, wherein:
the testing function manager is further configured to select at least one of: the testing function in the group of testing functions for testing operation of the entity based on capabilities of the entity to perform testing, and the testing function in the group of testing functions for testing operation of the other entity based on capabilities of the other entity to perform testing.

7. A method comprising:

defining a plurality of testing function groups for arranging testing functions, the testing functions being for testing operation of entities of a communication system;

defining a relative order of the plurality of testing function groups based on an order of operational dependency between the entities;

a testing function classifier assigning the testing functions to respective testing function groups of the plurality of testing function groups; and a testing function manager, implemented using hardware, associating an entity of a communication system with multiple testing function groups of the plurality of testing function groups by associating the entity with a group of testing functions for testing operation of the entity and further associating the entity with a group of testing functions for testing operation of another entity of the communication system based on an operational dependency between the entity and the other entity, the method further comprising:

causing a testing function in the group of testing functions for testing operation of the entity to be performed in the communication system; and causing a testing function in the group of testing functions for testing operation of the other entity to be performed in the communication system based on determining that the testing function for testing operation of the entity indicates an error in operation of the entity.

8. The method of claim 7, further comprising:

selecting at least one of: the testing function in the group of testing functions for testing operation of the entity based on capabilities of the entity to perform testing, and the testing function in the group of testing functions for testing operation of the other entity based on capabilities of the other entity to perform testing.

9. The method of claim 7, further comprising one or more of:

analyzing results of one or more selected testing function; and providing a representation of results of one or more selected testing function.

10. A non-transitory machine-readable medium storing instructions which when executed perform the method of claim 7.

\* \* \* \* \*